US012736309B2

(12) United States Patent
Cho et al.

(10) Patent No.: US 12,736,309 B2
(45) Date of Patent: Sep. 15, 2026

(54) MULTIPLE AND BROADBAND STEALTH STRUCTURE

(71) Applicant: Industry-academic Cooperation Foundation, YONSEI UNIVERSITY, Seoul (KR)

(72) Inventors: Hyung Hee Cho, Seoul (KR); Nam Kyu Lee, Anyang-si (KR); Joon Soo Lim, Seoul (KR); In Joong Chang, Seoul (KR); Hyung Mo Bae, Seoul (KR); Ju Yeong Nam, Seoul (KR)

(73) Assignee: Industry-academic Cooperation Foundation, YONSEI UNIVERSITY, Seoul (KR)

( * ) Notice: Subject to any disclaimer, the term of this patent is extended or adjusted under 35 U.S.C. 154(b) by 261 days.

(21) Appl. No.: 18/597,550

(22) Filed: Mar. 6, 2024

(65) Prior Publication Data

US 2024/0318940 A1 Sep. 26, 2024

(30) Foreign Application Priority Data

Mar. 23, 2023 (KR) ........................ 10-2023-0037749
Jan. 22, 2024 (KR) ........................ 10-2024-0009704

(51) Int. Cl.
*F41H 3/00* (2006.01)
*B64D 7/00* (2006.01)

(52) U.S. Cl.
CPC .................................... *F41H 3/00* (2013.01); *B64D 7/00* (2013.01)

(58) Field of Classification Search
CPC .................................. F41H 3/00; B64D 7/00
See application file for complete search history.

(56) References Cited

U.S. PATENT DOCUMENTS

2018/0069319 A1* 3/2018 Cho .......................... B32B 3/14
2022/0283344 A1* 9/2022 Hahn ...................... B32B 7/023

FOREIGN PATENT DOCUMENTS

CN 104990459 A 10/2015
CN 110412672 A * 11/2019 ............... G02B 5/20
CN 112009039 A 12/2020
KR 10-2013-0076011 A 7/2013
KR 10-1413462 B1 7/2014
KR 10-2018-0026150 A 3/2018

OTHER PUBLICATIONS

Machine translation of CN-110412672-A.*

* cited by examiner

*Primary Examiner* — Vladimir Magloire
*Assistant Examiner* — Anna K. Gosling
(74) *Attorney, Agent, or Firm* — Bridgeway IP Law Group, PLLC; Jihun Kim

(57) ABSTRACT

A multiple and broadband stealth structure comprises a radar absorption unit that absorbs broadband microwave, a low-frequency transmission filter unit that is stacked on an upper portion of the radar absorption unit, and an infrared radiation unit that is combined with the low-frequency transmission filter unit to selectively emit infrared ray, thereby selectively controlling the infrared emissivity of the surface to emit infrared radiation only through an atmospheric absorption window with a low infrared transmittance and to avoid the infrared detection system.

7 Claims, 5 Drawing Sheets

MULTIPLE AND BROADBAND STEALTH STRUCTURE

CROSS-REFERENCE TO RELATED APPLICATION

The present application claims priority to Korean Patent Application No. 10-2023-0037749, filed Mar. 23, 2023, and Korean Patent Application No. 10-2024-0009704, filed Jan. 22, 2024, the entire contents of which is incorporated herein for all purposes by this reference.

BACKGROUND OF THE INVENTION

Field of the Invention

The disclosure relates to a multiple and broadband stealth structure, and more specifically, to a multiple and broadband stealth structure that selectively controls the infrared emissivity of the surface to emit infrared radiation only through an atmospheric absorption window (5 to 8 μm) with a low infrared transmittance and to avoid the infrared detection system.

Description of the Related Art

A radar refers to detecting a target object using reflected and returned radio waves after sending out artificial radio waves from a device generating electromagnetic waves. Infrared (IR) is a waveform appearing around an object in a certain form unless temperature of the object is the absolute zero degree (K), which is detected using equipment such as an Infrared Search and Track (IRST) system or the like and applied to various military equipment, missile techniques and the like, in addition to aircrafts, together with a technique of detecting the radar.

An infrared anti-detection technique and a radar anti-detection technique are techniques for enhancing camouflage of aircrafts, vessels and various military equipment, which enhance survivability of allies by minimizing observability of the allies in a situation confronted with enemies.

Specifically, an infrared detector detects a target using a difference between thermal energy signals of a detection target and its background, and generally, a weapon system including aircrafts, vessels, tanks and the like has a high temperature compared with the surrounding atmosphere and ground surface due to heat generation of high-temperature engines. Particularly, an aircraft flying at supersonic speed has a temperature higher than the temperature of the surrounding atmosphere since the surface temperature increases due to friction with the air. In such an environment, the lower the temperature and the emissivity of a detection target, the lower the probability of detection since magnitude of the infrared energy emitted from the detection target is reduced.

In addition, as described above, a radar detector sends out a radar signal and uses the signal reflected and returned from a detection target as a detecting means to detect a target object. Accordingly, it cannot prevent an enemy radar from sending out radio waves unless the radar detector is destroyed, but it is possible to prevent the radar detector from receiving the reflected waves returning back. Specifically, the more the returning radar waves are reduced by absorbing much of the radar waves input into an object, the lower the probability of detection by the radar detector. A measure of determining how much radio waves an object reflects is expressed as a numeric value referred to as a Radar Cross Section (RCS). The smaller the RCS value, the smaller the object displayed on the radar of the enemy, and general aircrafts have a value larger than 1.0 $m^2$, whereas aircrafts having a high anti-detection performance by reducing the RCS value may have a value of 0.01 $m^2$ to 0.0001 $m^2$.

As is confirmed from the above description, the method of avoiding detection by an infrared detector is different from the method of avoiding detection by a radar detector.

As a well-known method for radar anti-detection, there is a method of drastically reducing radio waves returning to an enemy radar by applying a radar absorbing material (RAM) on the surface of an aircraft. However, a painting material such as the RAM has many disadvantages from the aspect of maintenance/management/feasibility, such as repeatedly re-applying the painting material each time the aircraft is operated to maintain the anti-detection performance since the painting material is eroded.

In order to prevent detection by an infrared detector, the heat naturally emitted from the surface of an object should be reduced as described above, and to this end, techniques of coating an absorption coating layer on the surface of a target object have been disclosed.

Under the recognition that detection by a radar detector and detection by an infrared detector should be prevented together in order to effectively cope with threats of enemies, studies on techniques of combining a radar anti-detection technique and an infrared anti-detection technique are actively progressed recently.

For example, there are Korean Patent Application Publication No. 10-2013-0076011 A and Chinese Patent Application Publication No. 2015-10390745.

The prior art as described above has tried to accomplish the object of anti-detection by preparing a material compatible to both radar waves and infrared waves through a method of fiber reinforcement or chemical modification. However, like the application of RAM paint described above, such a method is not free from a phenomenon of erosion or the like by the friction with the air during the high-speed operation of the aircraft. In addition, since it is a patent related to the composition, it is difficult to verify its durability.

Documents of Related Art (Patent Document 1) KR Registered Patent No. 10-1413462 (2014 Jun. 24)

SUMMARY OF THE INVENTION

In order to solve the above problems, an object of the disclosure is to provide a multiple and broadband stealth structure that can evade infrared detection systems through radar absorption and infrared radiation by intermediating a low-frequency transmission filter unit between a radar absorption unit that absorbs broadband microwaves of S (2 to 4 GHZ), C (4 to 8 GHZ), and X (8 to 12 GHz), which are mainly used in military detection bands, and an infrared radiation unit that selectively emits infrared rays, as well as ensuring the thermal stability of an object by dissipating internal heat energy by radiating infrared energy into the atmospheric absorption band (5 to 8 μm).

The technical objects to be achieved by the present invention are not limited to the technical objects mentioned above, and other technical objects not mentioned may be clearly understood by those skilled in the art from the following descriptions.

In order to achieve the above object, the configuration of the disclosure provides a multiple and broadband stealth structure, comprising a radar absorption unit that absorbs broadband microwave; a low-frequency transmission filter unit that is stacked on an upper portion of the radar absorption unit; and an infrared radiation unit that is combined with the low-frequency transmission filter unit to selectively emit infrared ray.

In an embodiment of the disclosure, the radar absorption unit may include a thin layer, a first dielectric layer that extends upward from an edge of the thin film; and a first seating member in which vertices of four triangles are located at one center, and the four triangles are arranged radially from the one center, and which is formed on an upper surface of the thin film.

In an embodiment of the disclosure, the thin film and first seating member may be made of any one of aluminum (Al), gold (Au), silver (Ag), copper (Cu), and platinum (Pt), the first dielectric layer may be made of any one of polyimide, polydimethylsiloxane (PDMS), and polyethylene terephthalate (PET).

In an embodiment of the disclosure, the low-frequency transmission filter may include a second dielectric layer; and a plurality of second seating members that is formed in a pattern on an upper surface of the second dielectric layer, wherein at least a portion of the second dielectric layer may be exposed to an outside between adjacent second seating members among the plurality of second seating members.

In an embodiment of the disclosure, 5 the second dielectric layer may be made of any one of polyimide, polydimethylsiloxane (PDMS), and polyethylene terephthalate (PET), and the second seating member may be made of any one of aluminum (Al), gold (Au), silver (Ag), copper (Cu), and platinum (Pt).

In an embodiment of the disclosure, the infrared radiation unit may include a plurality of base members that is arranged to be spaced apart at a predetermined distance on the upper surface of the second dielectric layer; and a plurality of metal-dielectric materials with a cylindrical shape, wherein the plurality of metal-dielectric materials may be deposited on at least a portion of the second dielectric layer and an upper surface of the plurality of base members through an exposure method using a photoresist.

In an embodiment of the disclosure, the plurality of second seating members may be formed in a square shape, and a horizontal length and vertical length of the second seating member may be formed to be longer than a trench spacing, which is a distance between adjacent second seating members among the plurality of second seating members.

In an embodiment of the disclosure, if a size of the second seating member increases as the horizontal length and vertical length of the second seating member become longer, a frequency at which more than 90% may be transmitted moves to low frequency.

In an embodiment of the disclosure, if the size of the second seating member decreases as the horizontal length and vertical length of the second seating member become shorter, the frequency at which more than 90% may be transmitted moves to high frequency.

In an embodiment of the disclosure, the metal-dielectric material may be made of any one of magnesium fluoride ($MgF_2$), zinc sulfide (ZnS), aluminum nitride (AlN), aluminum oxide ($Al_2O_3$), silicon oxide ($SiO_2$), and silicon nitride ($Si_3N_4$).

DETAILED DESCRIPTION OF THE INVENTION

Figure 1:
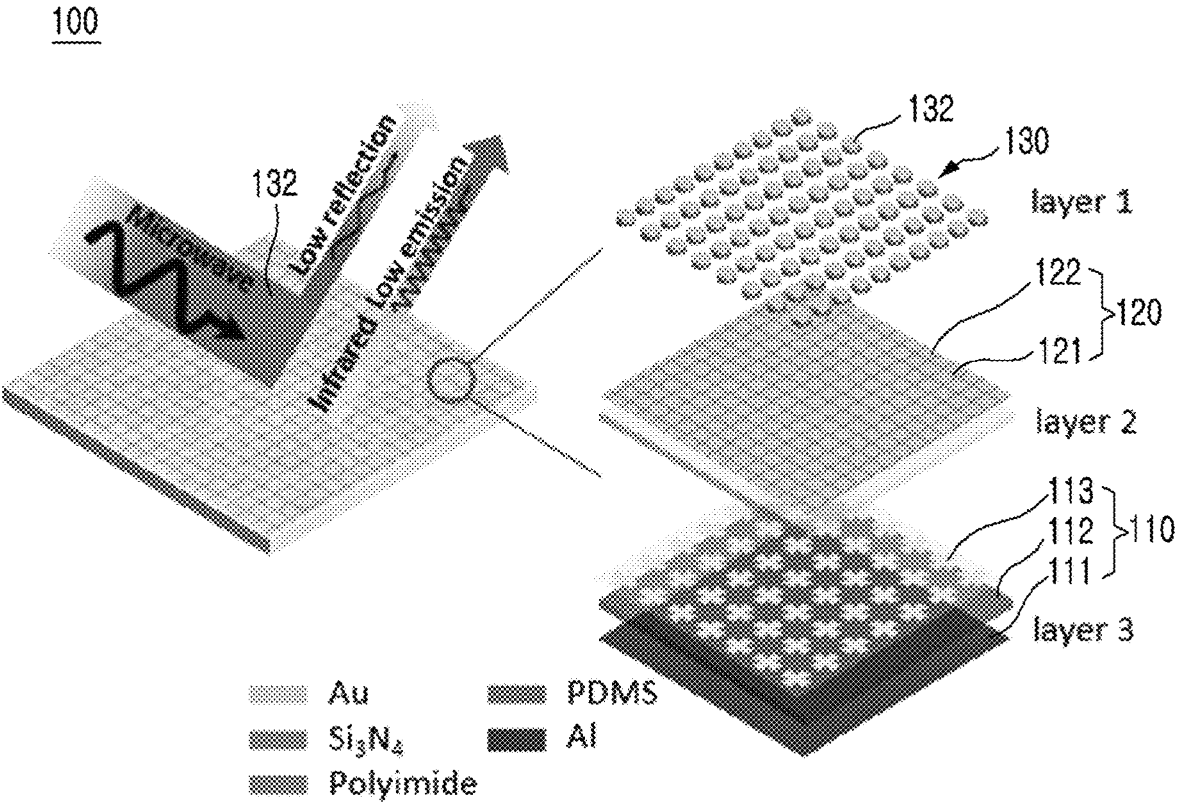
FIG. 1 illustrate a perspective view and exploded perspective view in one direction of a multiple and broadband stealth structure, according to an embodiment of the disclosure.

Hereinafter, the disclosure will be explained with reference to the accompanying drawings. The disclosure, however, may be modified in various different ways, and should not be construed as limited to the embodiments set forth herein. Also, in order to clearly explain the disclosure, portions that are not related to the disclosure are omitted, and like reference numerals are used to refer to like elements throughout the specification.

Throughout the specification, when a part is connected (accessed, contacted, or coupled) with other parts, it includes "direct connection" as well as "indirect connection" in which the other member is positioned between the parts. Also, it will also be understood that when a part "includes" a component, unless stated otherwise, this does not mean that other components are excluded but the other components can be added.

The terms used in this specification are merely used to describe particular embodiments, and are not intended to limit the disclosure. Expression in the singular number include a plural forms unless the context clearly indicates otherwise. In this specification, it will be understood that the term "comprise" or "have" is intended to designate characteristic, numbers, steps, operations, elements, components, or combinations thereof, but it is not intended to preclude the presence or addition of one or more other features, numbers, steps, operations, elements, components, or combinations.

Hereinafter, embodiments of the invention will be described in detail with reference to the attached drawings.

FIG. 1 illustrate a perspective view and exploded perspective view in one direction of a multiple and broadband stealth structure, according to an embodiment of the disclosure.

Referring to FIG. 1, a multiple and broadband stealth structure 100 according to an embodiment of the disclosure includes a radar absorption unit 110, a low-frequency transmission filter unit 120, and an infrared radiation unit 130.

Figure 2B:
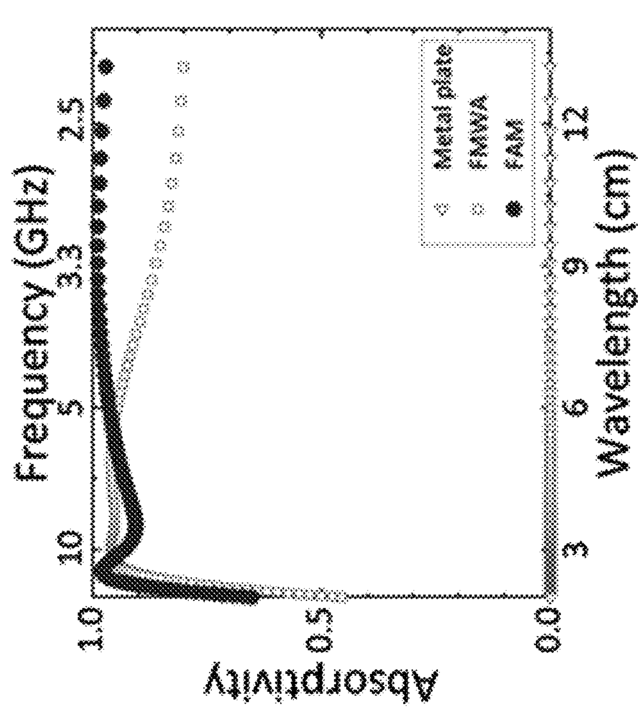
FIG. 2B is a graph measuring the microwave band absorption of a broadband radar stealth structure to which a radar absorption unit and low-frequency transmission filter unit provided in a multiple and broadband stealth structure are combined, according to an embodiment of the disclosure.
Figure 2A:
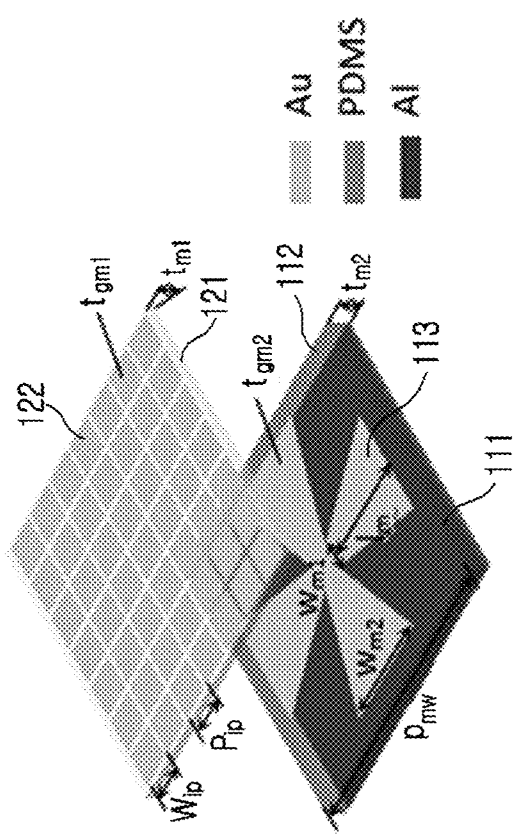
FIG. 2A is a perspective view in one direction illustrating a radar absorption unit and low-frequency transmission filter unit provided in a multiple and broadband stealth structure, according to an embodiment of the disclosure.

FIG. 2A is a perspective view in one direction illustrating a radar absorption unit and low-frequency transmission filter unit provided in a multiple and broadband stealth structure, according to an embodiment of the disclosure. FIG. 2B is a graph measuring the microwave band absorption of a broadband radar stealth structure to which a radar absorption unit and low-frequency transmission filter unit provided in a multiple and broadband stealth structure are combined, according to an embodiment of the disclosure.

The radar absorption unit 110 absorbs broadband microwaves.

To this end, the radar absorption unit 110 includes a thin film 111, a first dielectric layer 112, and a first seating member 113, as illustrated in FIG. 1 and FIG. 2A.

The thin film 111 is an ultra-thin layer located at the bottom in the disclosure.

The above thin film 111 is made of any one of aluminum (Al), gold (Au), silver (Ag), copper (Cu), and platinum (Pt).

The first dielectric layer 112 extends upward from the edge of the thin film 111.

The first dielectric layer 112 is made of one of polyimide, polydimethylsiloxane (PDMS), and polyethylene terephthalate (PET).

In particular, when the first dielectric layer 112 is made of polydimethylsiloxane (PDMS), as the thickness of polydimethylsiloxane (PDMS) increases, it can absorb low frequency bands, while as the thickness of polydimethylsiloxane (PDMS) decreases, it can absorb high-frequency bands.

The first seating member 113, in which the vertices of four triangles are located at one center, and the four triangles are arranged radially from the above-described one center, is formed on the upper surface of the thin film 111.

The above first seating member 113 is made of any one of aluminum (Al), gold (Au), silver (Ag), copper (Cu), and platinum (Pt).

Referring to FIG. 2B, it can be confirmed that the flexible microwave absorber (FMWA) has an absorptivity of 90% or greater in the S (2-4 GHZ), C (4-8 GHZ), and X (8-12 GHz) bands.

In addition, it can be confirmed that the microwave absorption performance appears to be further improved in the 2.5 to 5 GHz band when combined with the low-frequency transmission filter unit 120 and infrared radiation unit 130 located on the upper portion of the radar absorption unit 110, thereby increasing radar stealth performance.

Figure 3:
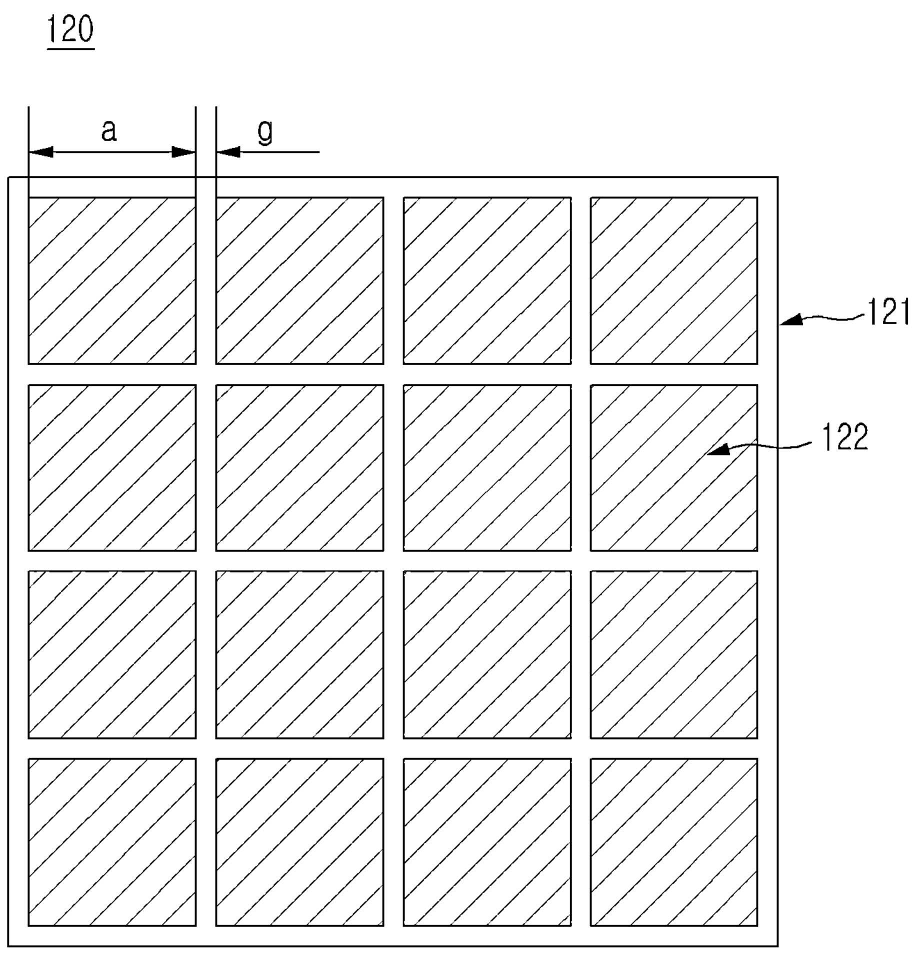
FIG. 3 is a plan view in one direction illustrating the low-frequency transmission filter unit of FIG. 1.
Figures 4A, 4B, 4C:
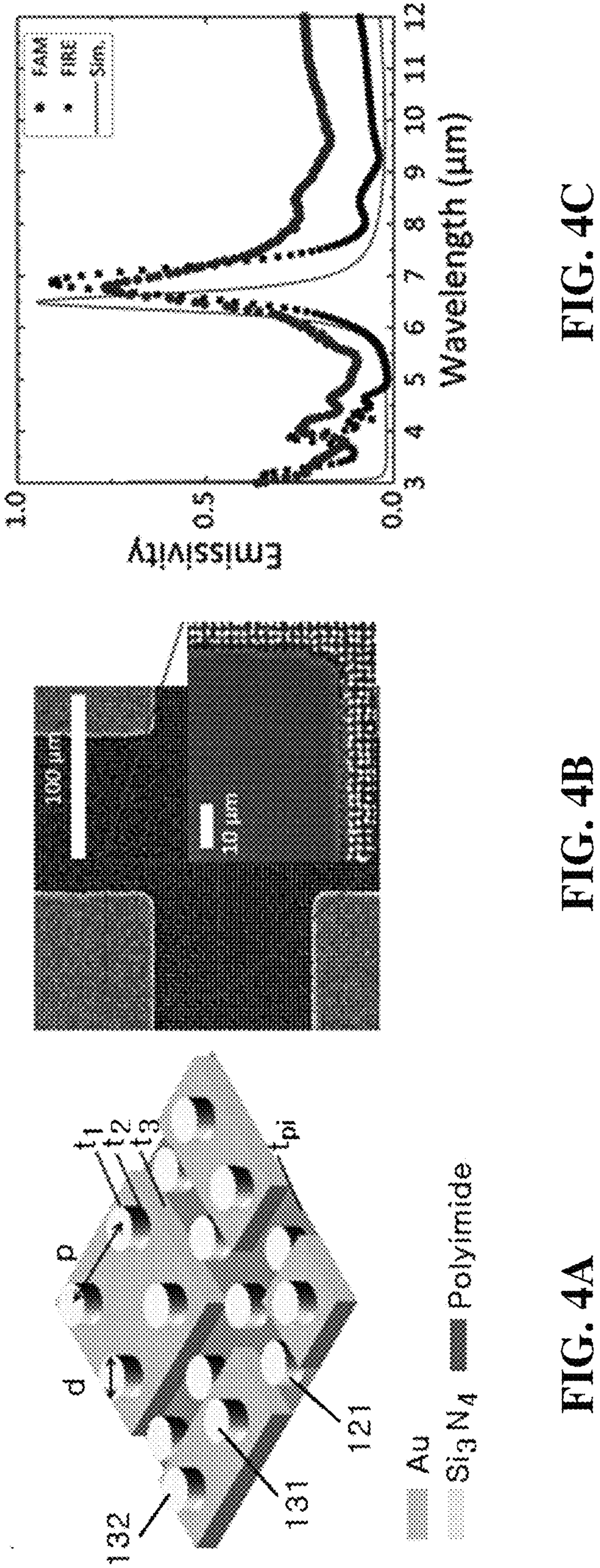
FIG. 4A is a perspective view in one direction illustrating a low-frequency transmission filter unit and infrared radiation unit provided in a multiple and broadband stealth structure according to an embodiment of the disclosure.
FIG. 4B is an image taken with a scanning microscope of a flexible IR emitter (FIRE) in which an infrared radiation unit provided in a multiple and broadband stealth structure is deposited on a low-frequency transmission filter unit, according to an embodiment of the disclosure.
FIG. 4C is a graph measuring the emissivity of a flexible IR emitter (FIRE).

FIG. 3 is a plan view in one direction illustrating the low-frequency transmission filter unit of FIG. 1. FIG. 4A is a perspective view in one direction illustrating a low-frequency transmission filter unit and infrared radiation unit provided in a multiple and broadband stealth structure according to an embodiment of the disclosure. FIG. 4B is an image taken with a scanning microscope of a flexible IR emitter (FIRE) in which an infrared radiation unit provided in a multiple and broadband stealth structure is deposited on a low-frequency transmission filter unit, according to an embodiment of the disclosure. FIG. 4C is a graph measuring the emissivity of a flexible IR emitter (FIRE).

The low-frequency transmission filter unit 120 is stacked on the upper portion of the radar absorption unit 110.

Specifically, referring to FIGS. 1, 2A, 3, and 4A, the low-frequency transmission filter unit 120 includes a second dielectric layer 121 and a second seating member 122.

The second dielectric layer 121 may have a thin thickness like a thin film.

Specifically, as illustrated in FIG. 2, the second dielectric layer 121 is arranged in a matrix such that a plurality of second seating members 122 is spaced apart from each other by a trench spacing (g) in the horizontal and vertical directions.

Accordingly, at least a portion of the second dielectric layer 121 is exposed to the outside between adjacent second seating members 122 among the plurality of second seating members 122.

The above second dielectric layer 121 is made of one of polyimide, polydimethylsiloxane (PDMS), and polyethylene terephthalate (PET).

In particular, when the second dielectric layer 121 is made of polydimethylsiloxane (PDMS), the thinner the thickness of polydimethylsiloxane (PDMS), the less influence it has on the designed absorption performance of the microwave absorber.

More specifically, for broadband absorption in the low frequency band, the thickness of polydimethylsiloxane (PDMS) of the first dielectric layer 112 must be sufficiently greater than the thickness of polydimethylsiloxane (PDMS) of the second dielectric layer 121.

Referring to FIG. 3, the plurality of second seating members 122 is formed in a pattern on the upper surface of the second dielectric layer 121.

Specifically, the plurality of second seating members 122 is formed in a square shape.

In addition, referring to FIG. 3, the horizontal length (a) and vertical length (a) of the second seating member 122 are formed to be longer than the trench spacing (g), which is the distance between adjacent second seating members 122 among the plurality of second seating members 122.

If the size of the second seating member 122 increases as the horizontal length (a) and vertical length (a) of the second seating member 122 become longer, the frequency at which more than 90% is transmitted (cut-off frequency) moves to low frequency.

Here, increasing the horizontal length (a) and vertical length (a) of the second seating member 122 is equivalent to shortening the trench spacing (g).

On the other hand, if the size of the second seating member 122 decreases as the horizontal length (a) and vertical length (b) of the second seating member 122 become shorter, the frequency at which more than 90% is transmitted (cut-off frequency) moves to high frequency.

The above second seating member 122 is made of any one of aluminum (Al), gold (Au), silver (Ag), copper (Cu), and platinum (Pt).

The infrared radiation unit 130 is combined with the low-frequency transmission filter unit 120 to selectively emit infrared rays.

To this end, the infrared radiation unit 130 includes a plurality of base members 131 and a plurality of metal-dielectric materials 132.

In addition, the base member 131 may have a hexahedral shape with different sizes, as illustrated in FIG. 3A.

In addition, one, two, or four metal-dielectric materials 132 are attached to the upper surfaces of the plurality of base members 131.

The metal-dielectric material 132 has a cylindrical shape.

In addition, the metal-dielectric material 132 may be made of any one of magnesium fluoride ($MgF_2$), zinc sulfide (ZnS), aluminum nitride (AlN), aluminum oxide ($Al_2O_3$), silicon oxide ($SiO_2$), and silicon nitride ($Si_3N_4$).

The above plurality of metal-dielectric materials 132 is deposited on at least a portion of the second dielectric layer 121 and the upper surface of the base member 131 through an exposure method using a photoresist, as illustrated in FIG. 4A, an image taken with a scanning microscope of a flexible IR emitter (FIRE) manufactured through the above-described process is illustrated in FIG. 4B.

In this case, the emissivity was measured using Fourier Transform Infrared Spectroscopy (FT-IR) equipment.

In addition, referring to FIG. 4C, it can be confirmed that the influence of the substructure is minimized, and the infrared selective emitter performance and stealth function in the infrared detection band (3 to 5 μm, 8 to 12 μm) are maintained.

That is, the disclosure, which integrates the radar absorption unit 110 and the infrared radiation unit 130 through the low-frequency transmission filter unit 120, has a stealth flexible structure with infrared-radar integration (Flexible Assembled Metamaterials, FAM), and can maintain and improve the stealth function.

Figures 5A, 5B, 5C:
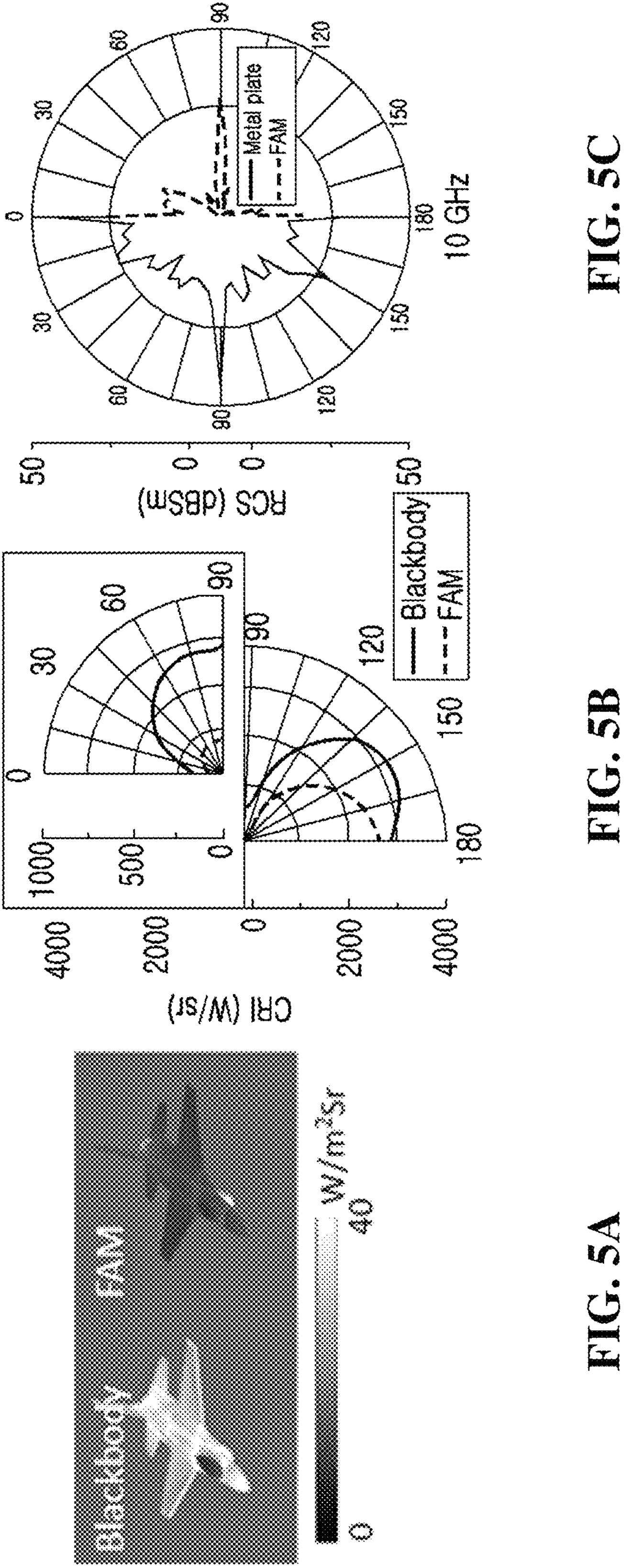
FIG. 5A is an IR image illustrating radiation characteristics under aircraft operating conditions when applying a FAM structure.
FIG. 5B is a graph illustrating a contrast radiance intensity (CRI) between an aircraft and an atmosphere by direction.
FIG. 5C is a graph illustrating an RCS signal strength by direction.

FIG. 5A is an IR image illustrating radiation characteristics under aircraft operating conditions when applying a FAM structure. FIG. 5B is a graph illustrating a contrast radiance intensity (CRI) between an aircraft and an atmosphere by direction. FIG. 5C is a graph illustrating an RCS signal strength by direction.

FIG. 5 shows the detectability evaluation results to evaluate the effectiveness of the FAM structure.

First, FIG. 5A shows the results of surface infrared radiation intensity under aircraft operating conditions. The aircraft with paints with high emissivity can easily be targeted by infrared detectors due to its high radiation intensity.

However, in the case of aircraft with FAM applied, the infrared radiation intensity of the surface is lowered and the CRI in each direction is also greatly reduced, thereby greatly increasing infrared detectability.

Next, FIGS. 5B and 5C show the results of the radar reflection intensity lowered by the radar absorber absorbing microwaves on the reduction of the RCS signal. In the case of a metal type with a high reflection intensity, the RCS signal is transmitted in all directions. On the other hand, in case of applying the FAM, the RCS signal can be greatly reduced, and radar stealth can be implemented through this.

The description of the disclosure is used for illustration and those skilled in the art will understand that the disclosure can be easily modified to other detailed forms without changing the technical spirit or an essential feature thereof. Therefore, the aforementioned embodiments are all illustrative in all aspects and are not limited. For example, each component described as a single type may be implemented to be distributed and similarly, components described to be distributed may also be implemented in a combined form.

The scope of the disclosure is to be defined by the scope of claims provided below, and all variations or modifications that can be derived from the meaning and scope of the claims as well as their equivalents are to be interpreted as being encompassed within the scope of the disclosure.

The effect of the disclosure according to the above configuration is to evade infrared detection systems through radar absorption and infrared radiation by intermediating the low-frequency transmission filter unit between the radar absorption unit that absorbs broadband microwaves of S (2 to 4 GHZ), C (4 to 8 GHZ), and X (8 to 12 GHz), which are mainly used in military detection bands, and the infrared radiation unit that selectively emits infrared rays, as well as ensuring the thermal stability of an object by dissipating internal heat energy by radiating infrared energy into the atmospheric absorption band (5 to 8 μm).

The effects of the disclosure are not limited to the above-mentioned effects, and it should be understood that the effects of the disclosure include all effects that could be inferred from the configuration of the invention described in the detailed description of the invention or the appended claims.

DESCRIPTION OF REFERENCE NUMERALS

100: multiple and broadband stealth structure
110: radar absorption unit
111: thin layer
112: first dielectric layer
113: first seating member
120: low-frequency transmission filter unit
121: second dielectric layer
122: second seating member
130: infrared radiation unit
131: base member
132: metal-dielectric material

What is claimed is:

1. A multiple and broadband stealth structure, comprising:
a radar absorption unit configured to absorb broadband microwave;
a low-frequency transmission filter unit disposed on an upper portion of the radar absorption unit; and
an infrared radiation unit combined with the low-frequency transmission filter unit to selectively emit infrared radiation,
wherein the radar absorption unit includes:
a thin film;
a first dielectric layer extending upward from an edge of the thin film; and
a first seating member having four triangles in which vertices of the four triangles are positioned at one center, and the four triangles are arranged radially from the one center, the first seating member being disposed on an upper surface of the thin film.

2. The multiple and broadband stealth structure of claim 1,
wherein the thin film and the first seating member include any one of aluminum (Al), gold (Au), silver (Ag), copper (Cu), and platinum (Pt), and
wherein the first dielectric layer includes any one of polyimide, polydimethylsiloxane (PDMS), and polyethylene terephthalate (PET).

3. The multiple and broadband stealth structure of claim 1,
wherein the low-frequency transmission filter unit includes:
a second dielectric layer; and
a plurality of second seating members arranged in a pattern on an upper surface of the second dielectric layer,
wherein at least a portion of the second dielectric layer is exposed to an outside between adjacent second seating members among the plurality of second seating members.

4. The multiple and broadband stealth structure of claim 3, wherein the second dielectric layer includes any one of polyimide, polydimethylsiloxane (PDMS), and polyethylene terephthalate (PET), and wherein each of the plurality of second seating members includes any one of aluminum (Al), gold (Au), silver (Ag), copper (Cu), and platinum (Pt).

5. The multiple and broadband stealth structure of claim 3, wherein the infrared radiation unit includes:

a plurality of base members arranged to be spaced apart at a predetermined distance on the upper surface of the second dielectric layer; and a plurality of metal-dielectric materials, each having a cylindrical shape, wherein the plurality of metal-dielectric materials is deposited on at least a portion of the second dielectric layer and an upper surface of the plurality of base members through an exposure method using a photoresist.

6. The multiple and broadband stealth structure of claim 3, wherein each of the plurality of second seating members has a square shape, and wherein horizontal length and vertical length of each of the plurality of second seating members are longer than a trench spacing, which is a distance between adjacent second seating members among the plurality of second seating members.

7. The multiple and broadband stealth structure of claim 5, wherein each of the plurality of metal-dielectric materials includes any one of magnesium fluoride ($MgF_2$), zinc sulfide (ZnS), aluminum nitride (AlN), aluminum oxide ($Al_2O_3$), silicon oxide ($SiO_2$), and silicon nitride ($Si_3N_4$).

* * * * *